(12) United States Patent
Tamai et al.

(10) Patent No.: US 8,531,144 B2
(45) Date of Patent: Sep. 10, 2013

(54) SYNCHRONOUS-MACHINE STARTING DEVICE

(75) Inventors: Shinzo Tamai, Minato-ku (JP); Yosuke Fujii, Minato-ku (JP); Akinobu Ando, Minato-ku (JP); Yasuhiko Hosokawa, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 298 days.

(21) Appl. No.: 13/129,993

(22) PCT Filed: Nov. 18, 2008

(86) PCT No.: PCT/JP2008/070900
§ 371 (c)(1),
(2), (4) Date: May 18, 2011

(87) PCT Pub. No.: WO2010/058449
PCT Pub. Date: May 27, 2010

(65) Prior Publication Data
US 2011/0254491 A1    Oct. 20, 2011

(51) Int. Cl.
*H02P 6/18* (2006.01)

(52) U.S. Cl.
CPC ..................................... *H02P 6/185* (2013.01)
USPC ............ 318/400.33; 318/400.32; 318/400.01; 318/700

(58) Field of Classification Search
CPC ....................................................... H02P 6/185
USPC .................. 318/400.33, 400.32, 400.01, 700
See application file for complete search history.

(56) References Cited

U.S. PATENT DOCUMENTS

| 6,639,377 B2 | 10/2003 | Iwaji et al. |
| 6,844,707 B1 * | 1/2005 | Raad ................................ 322/29 |
| 2004/0207358 A1 | 10/2004 | Tobari et al. |
| 2011/0181220 A1 | 7/2011 | Tamai et al. |

FOREIGN PATENT DOCUMENTS

| JP | 2002 272194 | 9/2002 |
| JP | 2003 259699 | 9/2003 |
| JP | 2004 289959 | 10/2004 |

(Continued)

OTHER PUBLICATIONS

International Search Report issued Feb. 24, 2009 in PCT/JP08/70900 filed Nov. 18, 2008.

(Continued)

*Primary Examiner* — Bentsu Ro
*Assistant Examiner* — David Luo
(74) *Attorney, Agent, or Firm* — Oblon, Spivak, McClelland, Maier & Neustadt, L.L.P.

(57) ABSTRACT

A synchronous-machine starting device includes an induction voltage operating unit calculating an induction voltage induced to an armature of a synchronous machine based on an estimated phase representing a position of a rotor, an estimated rotational speed of a rotor, an AC voltage signal, and an AC current signal, and outputting an induction voltage signal representing the calculated induction voltage, a selection unit selecting and outputting one of the induction voltage signal received from the induction voltage operating unit and the AC voltage signal received from the AC voltage detection unit, and a feedback operating unit outputting a speed signal representing the calculated estimated rotational speed based on calculated phase error to the induction voltage operating unit, and outputting a position signal representing the calculated estimated phase to the electric power conversion control unit and the induction voltage operating unit.

4 Claims, 2 Drawing Sheets

(56) References Cited

FOREIGN PATENT DOCUMENTS

| JP | 2005 65410 | 3/2005 |
|---|---|---|
| JP | 2006 271038 | 10/2006 |
| JP | 2008 263692 | 10/2008 |

OTHER PUBLICATIONS

U.S. Appl. No. 13/391,947, filed Feb. 23, 2012, Tamai, et al.
U.S. Appl. No. 13/132,792, filed Jun. 3, 2011, Tamai, et al.

* cited by examiner

SYNCHRONOUS-MACHINE STARTING DEVICE

TECHNICAL FIELD

The present invention relates to a synchronous-machine starting device, and particularly to a synchronous-machine starting device that detects the position of a rotor of a synchronous machine.

BACKGROUND ART

Synchronous-machine starting devices for starting synchronous machines such as electric generator and electric motor have been developed. Conventionally, the synchronous-machine starting device uses a mechanical distributor for detecting the position of a rotor of a synchronous machine by means of a proximity switch or the like. The mechanical distributor, however, is liable to be broken and influenced by noise due to many wires.

An example of the synchronous-machine starting device for eliminating the need for such a mechanical distributor is disclosed in Japanese Patent Laying-Open No. 2006-271038 (Patent Document 1). Specifically, this synchronous-generator starting device includes an externally communicated converter formed of externally communicated devices such as thyristors, and an externally communicated inverter formed of externally communicated devices such as thyristors for converting DC (direct current) power obtained by the converter into AC (alternating current) power, and starts a synchronous generator receiving AC power obtained by the inverter. The synchronous-generator starting device includes an AC voltage detector for detecting a voltage of an armature terminal of the synchronous generator, an AC current detector for detecting an inverter output current flown from the inverter to an armature of the synchronous generator, an induction voltage operating circuit calculating, from the detected value of the inverter AC current from the output current detector and from a first estimated value of the synchronous generator's rotational speed, an in-phase component and an orthogonal component, relative to a first reference phase, of an induction voltage induced to an armature winding of the synchronous generator by a field current of the synchronous generator, and a PLL circuit outputting a second reference phase and a second estimated value of the synchronous generator's rotational speed that cause the orthogonal component of the first reference phase of the induction voltage from the induction voltage operating circuit to be zero. This synchronous-generator starting device generates a gate pulse of the inverter of a predetermined control advance angle, based on the second reference phase that is output from the PLL circuit, and applies the second reference phase to the first reference phase of the induction voltage operating circuit, and applies the second estimated value of the synchronous generator's rotational speed to the first estimated value of the synchronous generator's rotational speed of the induction voltage operating circuit.

Patent Document 1: Japanese Patent Laying-Open No. 2006-271038

DISCLOSURE OF THE INVENTION

Problems to be Solved by the Invention

The voltage supplied to an armature of a synchronous machine at start-up is significantly lower than the rated voltage in a steady state, for example, $1/1000$ of the rated voltage. Therefore, the configuration disclosed in Patent Document 1 may not be able to stably start the synchronous machine because of the difficulty in detecting with high precision the voltage supplied to the armature of the synchronous machine at start-up and in accurately detecting the position of the rotor.

An object of the present invention is therefore to provide a synchronous-machine starting device capable of stably starting a synchronous machine.

Means for Solving the Problems

A synchronous-machine starting device according to an aspect of the present invention includes: an electric power conversion unit converting supplied electric power into AC power and supplying the AC power to an armature of a synchronous machine; an AC voltage detection unit detecting an AC voltage supplied to the armature of the synchronous machine and outputting an AC voltage signal representing the detected AC voltage; an AC current detection unit detecting an AC current supplied to the armature of the synchronous machine and outputting an AC current signal representing the detected AC current; a rotor position detection unit detecting a position of a rotor of the synchronous machine based on the AC voltage signal and the AC current signal; and an electric power conversion control unit controlling the electric power conversion unit based on the detected position of the rotor. The rotor position detection unit includes: an induction voltage operating unit calculating an induction voltage induced to the armature of the synchronous machine based on an estimated phase representing the position of the rotor, an estimated rotational speed of the rotor, the AC voltage signal, and the AC current signal, and outputting an induction voltage signal representing the calculated induction voltage; a selection unit selecting and outputting one of the induction voltage signal received from the induction voltage operating unit and the AC voltage signal received from the AC voltage detection unit; and a feedback operating unit calculating a phase error of the estimated phase based on the induction voltage signal or the AC voltage signal received from the selection unit, calculating the estimated phase and the estimated rotational speed based on the calculated phase error, outputting a speed signal representing the calculated estimated rotational speed to the induction voltage operating unit, and outputting a position signal representing the calculated estimated phase to the electric power conversion control unit and the induction voltage operating unit.

A synchronous-machine starting device according to another aspect of the present invention includes: an electric power conversion unit converting supplied electric power into AC power and supplying the AC power to an armature of a synchronous machine; an AC voltage detection unit detecting an AC voltage supplied to the armature of the synchronous machine; an AC current detection unit detecting an AC current supplied to the armature of the synchronous machine; a rotor position detection unit detecting a position of a rotor of the synchronous machine based on the detected AC voltage and the detected AC current; and an electric power conversion control unit controlling the electric power conversion unit based on the detected position of the rotor. The rotor position detection unit includes: an induction voltage operating unit calculating a first-phase induction voltage and a second-phase induction voltage induced to the armature of the synchronous machine based on an estimated phase representing the position of the rotor, an estimated rotational speed of the rotor, the detected AC voltage, and the detected AC current; and a feedback operating unit calculating a phase error of the estimated phase based on the calculated first-phase induction voltage and second-phase induction voltage, calculating the estimated phase and the estimated rotational speed based on the calculated phase error, and outputting a position signal representing the calculated estimated phase to the electric power conversion control unit. The feedback operating unit calculates the phase error based on a result of division performed using the first-phase induction voltage as a dividend and the second-phase induction voltage as a divisor.

Preferably, the feedback operating unit is capable of making a switch between calculation of the phase error based on a result of division performed using the first-phase induction voltage as a dividend and the second-phase induction voltage as a divisor, and calculation of the phase error based on a result of division performed using the first-phase induction voltage as a dividend and fixing the divisor at a predetermined value.

A synchronous-machine starting device according to still another aspect of the present invention includes: an electric power conversion unit converting supplied electric power into AC power and supplying the AC power to an armature of a synchronous machine; an AC voltage detection unit detecting an AC voltage supplied to the armature of the synchronous machine; an AC current detection unit detecting an AC current supplied to the armature of the synchronous machine; a rotor position detection unit detecting a position of a rotor of the synchronous machine based on the detected AC voltage and the detected AC current; and an electric power conversion control unit controlling the electric power conversion unit based on the detected position of the rotor. The rotor position detection unit includes: an induction voltage operating unit calculating a first-phase induction voltage and a second-phase induction voltage induced to the armature of the synchronous machine based on an estimated phase representing the position of the rotor, an estimated rotational speed of the rotor, the detected AC voltage, and the detected AC current; and a feedback operating unit calculating a phase error of the estimated phase based on the calculated first-phase induction voltage and second-phase induction voltage, calculating the estimated phase and the estimated rotational speed based on the calculated phase error, and outputting a position signal representing the calculated estimated phase to the electric power conversion control unit. The feedback operating unit calculates the estimated rotational speed by amplification of the calculated phase error, calculating the estimated phase by integration of the calculated estimated rotational speed, and capable of changing a gain for the amplification.

Effects of the Invention

In accordance with the present invention, a synchronous machine can stably be started.

Figure 1:
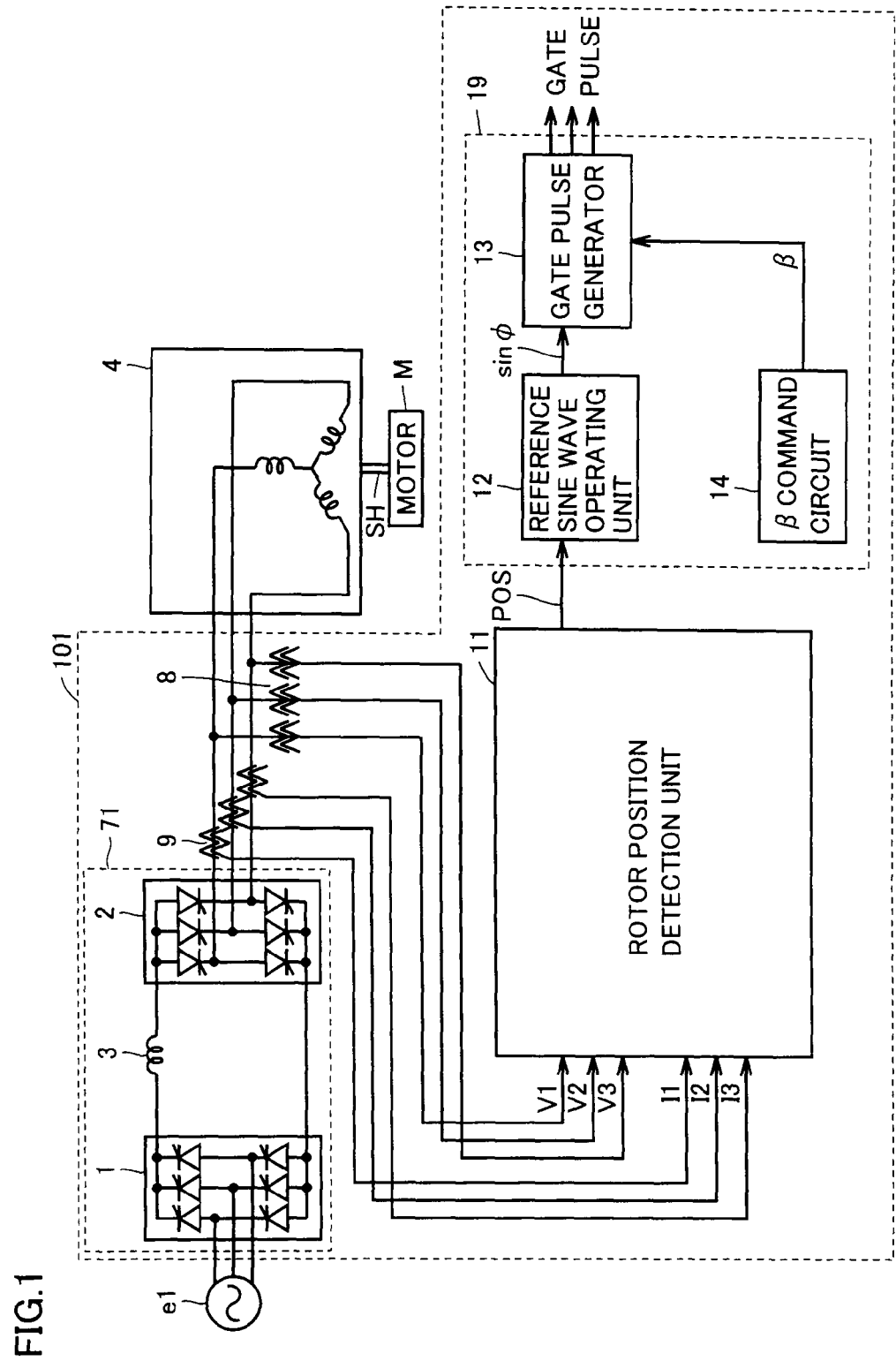
FIG. 1 is a diagram showing a configuration of a synchronous-machine starting device according to a first embodiment of the present invention.

DESCRIPTION OF THE REFERENCE SIGNS 1 converter; 2 inverter; 3 DC reactor; 8 AC voltage detector; 9 AC current detector; 11 rotor position detection unit; 12 reference sine wave operating unit; 13 gate pulse generator; 14 β command circuit; 19 inverter control unit (power conversion control unit); 31, 32 three-to-two phase transformation circuit; 33 induction voltage operating circuit; 34 PLL circuit; 41 division unit; 42 clamp unit; 43 error amplification unit; 44 integration unit; 51 gain multiplication unit; 52 addition unit; 53 integration unit; 61 induction voltage operating unit; 71 power conversion unit; 101 synchronous-machine starting device; SEL selection unit

BEST MODES FOR CARRYING OUT THE INVENTION

Embodiments of the present invention will hereinafter be described with the drawings. The same or corresponding components in the drawings are denoted by the same reference characters, and a description thereof will not be repeated.

First Embodiment

FIG. 1 is a diagram showing a configuration of a synchronous-machine starting device according to a first embodiment of the present invention.

Referring to FIG. 1, synchronous-machine starting device 101 includes an electric power conversion unit 71, an AC voltage detector 8, an AC current detector 9, a rotor position detection unit 11, and an inverter control unit (electric power conversion control unit) 19. Electric power conversion unit 71 includes a converter 1, an inverter 2, and a DC reactor 3. Inverter control unit 19 includes a reference sine wave operating unit 12, a gate pulse generator 13, and a β command circuit 14.

A synchronous machine 4 and a motor M are connected via a shaft SH. Synchronous machine 4 is for example a synchronous generator or synchronous motor, and has an armature and a rotor. Motor M rotates at a predetermined speed while synchronous machine 4 is in a standby state. This rotational speed is a low speed, specifically several rpm for example. In contrast, the rotational speed for a normal operation is 3000 rpm to 3600 rpm. Therefore, the voltage applied to the armature of synchronous machine 4 at start-up is a considerably low voltage which is $\frac{1}{1000}$ of the voltage in a steady state as described above, and the voltage detected by AC voltage detector 8 is often distorted. Because of this, accurate detection of the voltage is difficult.

Converter 1 is formed of such a device as thyristor and converts AC power from an AC power supply e1 into DC power.

Inverter 2 is formed of such a device as thyristor and converts the DC power obtained by converter 1 into AC power and supplies the AC power to the armature of synchronous machine 4 to thereby drive synchronous machine 4.

Converter 1 and inverter 2 are connected via DC reactor 3. The AC side of inverter 2 is connected to the armature of synchronous machine 4.

AC voltage detector 8 detects a three-phase AC voltage supplied to the armature of synchronous machine 4, and outputs detected voltage values V1, V2, V3 to rotor position detection unit 11.

AC current detector 9 detects a three-phase AC current supplied to the armature of synchronous machine 4, and outputs detected current values I1, I2, I3 to rotor position detection unit 11.

Rotor position detection unit 11 detects the position (phase) of the rotor of synchronous machine 4 based on the detected values received from AC voltage detector 8 and those from AC current detector 9, and outputs a rotor position signal POS representing the position of the rotor of synchronous machine 4 to inverter control unit 19.

Inverter control unit 19 controls inverter 2 based on rotor position signal POS received from rotor position detection unit 11.

In inverter control unit 19, reference sine wave operating unit 12 outputs a reference sine wave sin φ based on position signal POS received from rotor position detection unit 11.

β command circuit 14 calculates a control-advance-angle command value β and outputs the value to gate pulse generator 13.

Gate pulse generator 13 outputs a gate pulse to devices in inverter 2 based on reference sine wave sin φ received from reference sine wave operating unit 12 and control-advance-angle command value β received from β command circuit 14.

Figure 2:
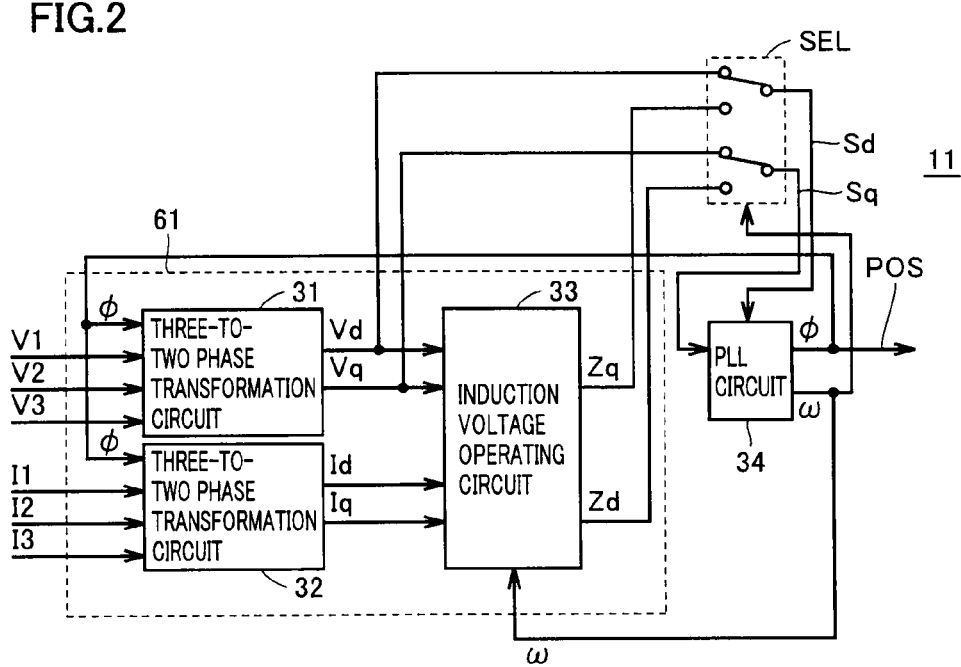
FIG. 2 is a diagram showing a configuration of a rotor position detection unit 11.

FIG. 2 is a diagram showing a configuration of rotor position detection unit 11.

Referring to FIG. 2, rotor position detection unit 11 includes an induction voltage operating unit 61, a PLL circuit (feedback operating unit) 34, and a selection unit SEL. Induction voltage operating unit 61 includes a three-to-two phase transformation circuits 31 and 32, and an induction voltage operating circuit 33.

Induction voltage operating unit 61 calculates an induction voltage induced to the armature of synchronous machine 4, based on an estimated phase representing the rotor position of synchronous machine 4, an estimated rotational speed of synchronous machine 4, detected voltage values V1, V2, V3 received from AC voltage detector 8, and detected current values I1, I2, I3 received from AC current detector 9, and outputs calculated induction voltage values Zq, Zd.

Selection unit SEL selects and outputs one of a set of induction voltage values Zq, Zd received from induction voltage operating circuit 33 and a set of voltage values Vd, Vq received from three-to-two phase transformation circuit 31.

PLL circuit 34 calculates an error of the estimated phase based on induction voltage values Zq, Zd or voltage values Vd, Vq received from selection unit SEL. PLL circuit 34 then calculates an estimated phase and an estimated rotational speed based on the calculated phase error, and outputs a speed signal w representing the calculated estimated rotational speed to induction voltage operating unit 61, and outputs a position signal φ representing the calculated estimated phase to inverter control unit 2 and induction voltage operating unit 61.

Accordingly, induction voltage operating unit 61 newly calculates an induction voltage induced to the armature of synchronous machine 4, based on speed signal ω and position signal φ received from PLL circuit 34 as well as detected voltage values V1, V2, V3 newly received from AC voltage detector 8 and detected current values I1, I2, I3 newly received from AC current detector 9.

More specifically, based on reference phase φ, three-to-two phase transformation circuit 31 performs three-to-two phase transformation (d-q transformation) of detected voltage values V1, V2, V3 received from AC voltage detector 8.

Based on reference phase φ, three-to-two phase transformation circuit 32 performs three-to-two phase transformation (d-q transformation) of detected current values I1, I2, I3 received from AC current detector 9.

Induction voltage operating circuit 33 calculates a two-phase induction voltage induced to the armature of synchronous machine 4, based on voltage values Vd and Vq generated through three-to-two phase transformation by three-to-two phase transformation circuit 31 as well as current values Id and Iq generated through three-to-two phase transformation by three-to-two phase transformation circuit 32.

In order to carry out coordinate transformation, namely three-to-two phase transformation of the voltage and the current by three-to-two phase transformation circuits 31 and 32, a reference phase which is synchronous with rotation of the rotor of synchronous machine 4 is necessary. Where no position sensor such as mechanical distributor is present, however, this signal is not directly obtained.

In the synchronous-machine starting device according to the first embodiment of the present invention, three-to-two phase transformation circuits 31 and 32 are thus provided with an initial value of reference phase φ at start-up of synchronous-machine starting device 101 to perform coordinate transformation.

Then, induction voltage operating circuit 33 calculates an induction voltage of the armature on the d-axis (in-phase component)—q-axis (orthogonal component) of synchronous machine 4, based on voltage values Vd, Vq and current values Id, Iq on the d-q axis that are generated through transformation by three-to-two phase transformation circuits 31 and 32. In order to calculate the induction voltage, rotational speed ω is necessary. Here, since there is no position sensor, an initial value of rotational speed ω of synchronous machine 4 is provided to induction voltage operating circuit 33 at start-up of synchronous-machine starting device 101.

If the q-axis component Zq of the induction voltage calculated by induction voltage operating circuit 33, namely the orthogonal component relative to reference phase φ, is not zero, reference phase φ is out of phase relative to the actual phase of the rotor of synchronous machine 4. This q-axis component Zq of the induction voltage corresponds to an error of the estimated phase of the rotor in synchronous machine 4. In view of this, in the synchronous-machine starting device according to the first embodiment of the present invention, PLL circuit 34 is provided that performs control so that the q-axis component Zq of the induction voltage is zero. PLL circuit 34 calculates rotational speed ω, namely an estimated rotational speed of the rotor of synchronous machine 4 and a reference phase φ, namely an estimated phase of the rotor of synchronous machine 4 that allow the q-axis component Zq of the induction voltage to be zero.

Reference phase φ calculated by PLL circuit 34 is fed back to three-to-two phase transformation circuits 31 and 32, and is also output as position signal POS to inverter control unit 19. Three-to-two phase transformation circuits 31 and 32 thereafter perform three-to-two phase transformation based on reference phase φ from PLL circuit 34.

Rotational speed ω calculated by PLL circuit 34 is supplied to induction voltage operating circuit 33. Induction voltage operating circuit 33 thereafter calculates an induction voltage value (in-phase component) Zd and an induction voltage value (orthogonal component) Zq based on rotational speed ω from PLL circuit 34.

In this way, induction voltage operating circuit 33 calculates an induction voltage induced to the armature of synchronous machine 4, based on voltage values Vd and Vq generated through transformation by three-to-two phase transformation circuit 31 as well as current values Id and Iq generated through transformation by three-to-two phase transformation circuit 32.

However, the voltage supplied to the armature of synchronous machine 4 at start-up is significantly lower than the rated voltage in a steady state, for example, $\frac{1}{1000}$ of the rated voltage. Further, since the frequency of the current supplied to the armature of synchronous machine 4 at start-up is low, a detection error of AC current detector 9 could be large for a low-frequency range.

Therefore, if induction voltage operating circuit 33 calculates an induction voltage based on significantly small voltage values Vd and Vq and current values Id and Iq having a large error, the difference between the induction voltage calculated by induction voltage operating circuit 33 and the voltage actually induced to the armature of synchronous machine 4 could be considerably large.

In view of this, the synchronous-machine starting device according to the first embodiment of the present invention is provided with selection unit SEL. Specifically, selection unit SEL makes a switch, based on rotational speed ω received from PLL circuit 34, between output to PLL circuit 34 voltage values Vd and Vq as selected voltage values Sd and Sq that have been generated through transformation by three-to-two phase transformation circuit 31, and output to PLL circuit 34 voltage values Zd and Zq as selected voltage values Sd and Sq that have been calculated by induction voltage operating circuit 33. For example, when synchronous machine 4 is started, namely rotational speed ω is less than a predetermined value, selection unit SEL causes induction voltage operating circuit 33 to be bypassed so that voltage values Vd and Vq are directly supplied to PLL circuit 34. When rotational speed ω of synchronous machine 4 is not less than the predetermined value, selection unit SEL supplies induction voltage values Zd and Zq to PLL circuit 34.

While selection unit SEL has been described as selecting one of the set of voltage values Vd and Vq and the set of induction voltage values Zd and Zq based on rotational speed ω received from PLL circuit 34, the selection unit is not limited to this. For example, selection unit SEL may be configured to make a selection based on the square root of the sum of the square of voltage value Vd and the square of voltage value Vq for example. In addition, because voltage value Vq is considerably smaller than voltage value Vd, the selection may be made based simply on voltage value Vd.

As has been described, in the synchronous-machine starting device according to the first embodiment of the present invention, at start-up where the voltage supplied to the armature of synchronous machine 4 is low and an error of the detected value of the current supplied to the armature of synchronous machine 4 is large, induction voltage operating circuit 33 is bypassed and the estimated rotational speed of the rotor of synchronous machine 4 and the estimated phase of the rotor of synchronous machine 4 are calculated based on voltage values Vd and Vq. This operation enables reduction of errors of the estimated rotational speed and the estimated phase of the rotor of the synchronous machine at start-up, and therefore the synchronous machine can stably be started.

While it has been described that electric power conversion unit 71 in the synchronous-machine starting device according to the first embodiment of the present invention is configured to include converter 1, inverter 2, and DC reactor 3, the electric power conversion unit is not limited to this. Electric power conversion unit 71 may be any as long as it is configured to include any circuit converting supplied electric power into AC power and supplying it to the armature of synchronous machine 4, such as matrix converter, instead of converter 1, inverter 2, and DC reactor 3.

Another embodiment of the present invention will now be described with the drawings. In the drawings, the same or corresponding components are denoted by the same reference characters, and a description thereof will not be repeated.

Second Embodiment

The present embodiment relates to a synchronous-machine starting device including an additional function for accurately performing calculation of the PLL circuit, relative to the synchronous-machine starting device in the first embodiment. Except for the details described below, the device in the present embodiment is similar to the synchronous-machine starting device in the first embodiment.

Figure 3:
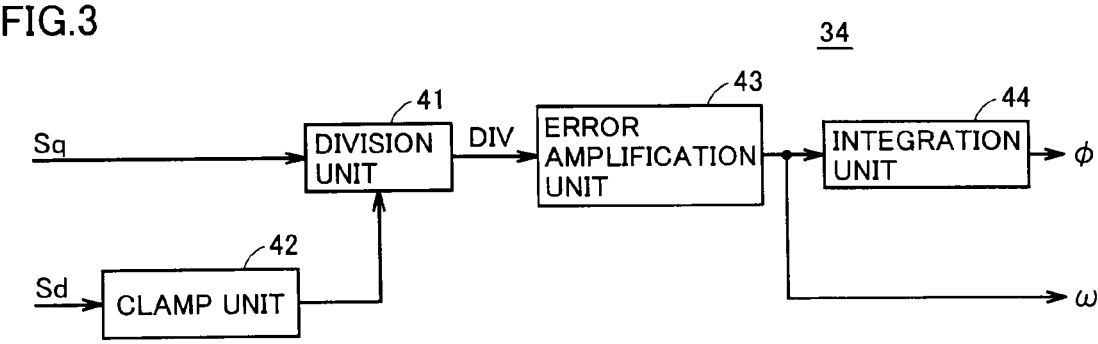
FIG. 3 is a diagram showing a configuration of a PLL circuit in a synchronous-machine starting device according to a second embodiment of the present invention.

FIG. 3 is a diagram showing a configuration of a PLL circuit in a synchronous-machine starting device according to a second embodiment of the present invention.

Referring to FIG. 3, PLL circuit 34 includes a division unit 41, a clamp unit 42, an error amplification unit 43, and an integration unit 44.

PLL circuit 34 uses division unit 41 to perform division for which selected voltage value Sq received from selection unit SEL is a dividend and selected voltage value Sd is a divisor. If the result of division DIV is not zero, the estimated phase calculated by PLL circuit 34 is out of phase relative to the actual phase of the rotor in synchronous machine 4. The result of division DIV corresponds to an error of the estimated phase of the rotor in synchronous machine 4.

If the estimated phase calculated by PLL circuit 34 is identical to the phase of the induction voltage of the armature in synchronous machine 4, induction voltage value Zq is zero. In contrast, where the estimated phase has an error, the phase error is expressed as $\tan^{-1}$ (Zq/Zd). Therefore, in principle, PLL circuit 34 may be controlled so that Zq is zero to successfully estimate the phase. Where excitation is constant, however, the voltage induced to the armature of synchronous machine 4 increases with an increase in rotational speed of synchronous machine 4. When the speed is low immediately after synchronous machine 4 is started and while the speed is increasing, the voltage induced to the armature of synchronous machine 4 is low. Therefore, as to the magnitude of induction voltage value Zq when the speed is low and that when the speed is high, the magnitude of induction voltage value Zq when the speed is high is larger even under the condition that phase errors are the same.

Where it is assumed that PLL circuit 34 does not include division unit 41, error amplification unit 43 receives induction voltage value Zq which varies depending on the rotational speed of synchronous machine 4, and accordingly the phase tracking performance of PLL circuit 34 varies depending on the rotational speed of synchronous machine 4. In particular, where the speed is low and the acceleration of synchronous machine 4 is large, PLL circuit 34 may not be able to track a change in phase of synchronous machine 4 to cause rotations of synchronous machine 4 and synchronous-machine starting device 101 to fail to be synchronous, depending on gain setting of PLL circuit 34.

In contrast, in the synchronous-machine starting device according to the second embodiment of the present invention, PLL circuit 34 includes division unit 41 so that error amplification unit 43 may be configured to receive Zq/Zd or $\tan^{-1}$ (Zq/Zd) instead of induction voltage value Zq. In this way, the response of PLL circuit 34 when the speed is low and the induction voltage is small can be improved. It is noted that error amplification unit 43 may be configured to receive $\tan^{-1}$ (Zq/Zd) and perform the operation to thereby improve precision in operation. Further, error amplification unit 43 may also be configured to receive Zq/Zd and perform the operation to thereby simplify the operating process.

Moreover, in the synchronous-machine starting device according to the second embodiment of the present invention, PLL circuit 34 makes a switch between division using selected voltage value Sq received from selection unit SEL as a dividend and selected voltage value Sd as a divisor, and division using selected voltage value Sq received from selection unit SEL as a dividend and fixing the divisor at a specific value.

More specifically, when selected voltage value Sd received from selection unit SEL is less than a predetermined value, clamp unit 42 clamps selected voltage value Sd at the predetermined value to output it to division unit 41.

Clamp unit 42 may also be configured to make a switch, based on rotational speed ω received from PLL circuit 34, between output of selected voltage value Sd received from selection unit SEL to division unit 41, and output of a predetermined value to division unit 41.

Division unit 41 performs division using selected voltage value Sq received from selection unit SEL as a dividend and a voltage received from clamp unit 42 as a divisor and outputs the result of division DIV to error amplification unit 43.

Error amplification unit 43 amplifies the phase error calculated as the result of division DIV, namely the result of division DIV received from division unit 41 to thereby calculate an estimated rotational speed of the rotor in synchronous machine 4, and outputs the estimated rotational speed as rotational speed ω. Here, error amplification unit 43 performs for example proportional integration on the result of division DIV.

Integration unit 44 integrates rotational speed ω received from error amplification unit 43 to thereby calculate the estimated phase of the rotor in synchronous machine 4 and outputs the estimated phase as reference phase φ.

Here, the voltage supplied to the armature of the synchronous machine when started is considerably smaller than the rated voltage in a steady state, for example, 1/1000 of the rated voltage, and therefore a detection error is large. In particular, because d-axis component Zd of the induction voltage has a value larger than that of q-axis component Zq thereof, an error of d-axis component Zd exerts a large influence on calculation of the phase error by division unit 41, namely calculation of selected voltage value Sq/selected voltage value Sd.

In view of this, in the synchronous-machine starting device according to the second embodiment of the present invention, clamp unit 42 is provided. Accordingly, selected voltage value Sd corresponding to d-axis component Zd is clamped at a predetermined value so that a voltage less than the predetermined value is not output to division unit 41. With this configuration, a large error in calculation of the phase error of the rotor in the synchronous machine at start-up can be prevented, and thus synchronous machine 4 can stably be started.

Features and operations other than those described above are similar to those of the synchronous-machine starting device according to the first embodiment, and the description will not be repeated here.

Still another embodiment of the present invention will now be described with the drawings. In the drawings, the same or corresponding components are denoted by the same reference characters, and a description thereof will not be repeated.

Third Embodiment

The present embodiment relates to a synchronous-machine starting device including an additional function of accurately performing PI operation relative to the synchronous-machine starting device according to the first embodiment. The synchronous-machine starting device in the present embodiment is similar to that of the second embodiment except for the details described below.

Figure 4:
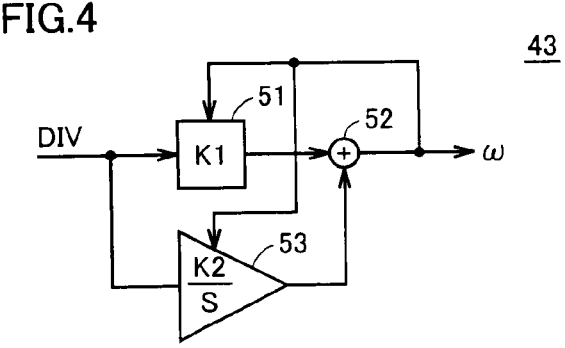
FIG. 4 is a diagram showing a configuration of an error amplification unit in a synchronous-machine starting device according to a third embodiment of the present invention.

FIG. 4 is a diagram showing a configuration of an error amplification unit in the synchronous-machine starting device according to the third embodiment of the present invention.

Referring to FIG. 4, error amplification unit 43 includes a gain multiplication unit 51, an addition unit 52, and an integration unit 53.

Gain multiplication unit 51 multiplies the result of division DIV received from division unit 41 and a gain K1. Integration unit 53 integrates result of division DIV received from division unit 41 based on a gain K2.

Addition unit 52 calculates the sum of the result of multiplication of gain multiplication unit 51 and the result of integration of integration unit 53 to output the sum as rotational speed ω.

Here, gain multiplication unit 51 changes gain K1 depending on whether synchronous machine 4 is at start-up or in a steady state. Integration unit 53 changes gain K2 depending on whether synchronous machine 4 is at start-up or in a steady state. For example, at the time when synchronous machine 4 is started, PLL circuit 34 receives a small voltage value and an error in detection is large, and therefore, gains K1 and K2 are decreased. In this way, the influence of the detection error can be lessened.

Further, since the acceleration of synchronous machine 4 is large when synchronous machine 4 is started, it is required in some cases that tracking of PLL circuit 34 should be performed speedily even if there is a certain detection error. In this case, contrary to the operation above, gain K1 is increased to expedite the response of PLL circuit 34 and further gain K2 is decreased so that the detection error is not integrated and amplified to a large extent.

In other words, in the synchronous-machine starting device according to the third embodiment of the present invention, the gains of gain multiplication unit 51 and integration unit 53 can be changed to balance the starting speed of synchronous machine 4 and the phase error detection accuracy.

Features and operations other than those described above are similar to those of the synchronous-machine starting device according to the second embodiment, and the description will not be repeated here.

It should be construed that embodiments disclosed herein are by way of illustration in all respects, not by way of limitation. It is intended that the scope of the present invention is defined by claims, not by the above description, and encompasses all modifications and variations equivalent in meaning and scope to the claims.

The invention claimed is:

1. A synchronous-machine starting device comprising:
an electric power conversion unit which converts supplied electric power into AC power and supplies the AC power to an armature of a synchronous machine;
an AC voltage detection unit which detects an AC voltage supplied to the armature of said synchronous machine and outputs an AC voltage signal representing said detected AC voltage;
an AC current detection unit which detects an AC current supplied to the armature of said synchronous machine and outputs an AC current signal representing said detected AC current;
a rotor position detection unit which detects a position of a rotor of said synchronous machine based on said AC voltage signal and said AC current signal; and
an electric power conversion control unit which controls said electric power conversion unit based on the detected position of said rotor,
said rotor position detection unit including:

an induction voltage operating unit which calculates an induction voltage induced to the armature of said synchronous machine based on an estimated phase representing the position of said rotor, an estimated rotational speed of said rotor, said AC voltage signal, and said AC current signal, and outputs an induction voltage signal representing said calculated induction voltage;

a selection unit which selects and outputs one of said induction voltage signal received from said induction voltage operating unit and said AC voltage signal received from said AC voltage detection unit; and a feedback operating unit which calculates a phase error of said estimated phase based on said induction voltage signal or said AC voltage signal received from said selection unit, calculates said estimated phase and said estimated rotational speed based on said calculated phase error, outputs a speed signal representing said calculated estimated rotational speed to said induction voltage operating unit, and outputs a position signal representing said calculated estimated phase to said electric power conversion control unit and said induction voltage operating unit.

2. A synchronous-machine starting device comprising:

an electric power conversion unit which converts supplied electric power into AC power and supplies the AC power to an armature of a synchronous machine;

an AC voltage detection unit which detects an AC voltage supplied to the armature of said synchronous machine;

an AC current detection unit which detects an AC current supplied to the armature of said synchronous machine;

a rotor position detection unit which detects a position of a rotor of said synchronous machine based on said detected AC voltage and said detected AC current; and an electric power conversion control unit which controls said electric power conversion unit based on the detected position of said rotor, said rotor position detection unit including:

an induction voltage operating unit which calculates a first-phase induction voltage and a second-phase induction voltage induced to the armature of said synchronous machine based on an estimated phase representing the position of said rotor, an estimated rotational speed of said rotor, said detected AC voltage, and said detected AC current; and a feedback operating unit which calculates a phase error of said estimated phase based on said calculated first-phase induction voltage and second-phase induction voltage, calculates said estimated phase and said estimated rotational speed based on said calculated phase error, and outputs a position signal representing said calculated estimated phase to said electric power conversion control unit, said feedback operating unit which calculates said phase error based on a result of division performed using said first-phase induction voltage as a dividend and said second-phase induction voltage as a divisor.

3. The synchronous-machine starting device according to claim 2, wherein said feedback operating unit is capable of making a switch between calculation of said phase error based on a result of division performed using said first-phase induction voltage as a dividend and said second-phase induction voltage as a divisor, and calculation of said phase error based on a result of division performed using said first-phase induction voltage as a dividend and fixing the divisor at a predetermined value.

4. A synchronous-machine starting device comprising:

an electric power conversion unit which converts supplied electric power into AC power and supplies the AC power to an armature of a synchronous machine;

an AC voltage detection unit which detects an AC voltage supplied to the armature of said synchronous machine;

an AC current detection unit which detects an AC current supplied to the armature of said synchronous machine;

a rotor position detection unit which detects a position of a rotor of said synchronous machine based on said detected AC voltage and said detected AC current; and an electric power conversion control unit which controls said electric power conversion unit based on the detected position of said rotor, said rotor position detection unit including:

an induction voltage operating unit which calculates a first-phase induction voltage and a second-phase induction voltage induced to the armature of said synchronous machine based on an estimated phase representing the position of said rotor, an estimated rotational speed of said rotor, said detected AC voltage, and said detected AC current; and a feedback operating unit which calculates a phase error of said estimated phase based on said calculated first-phase induction voltage and second-phase induction voltage, calculates said estimated phase and said estimated rotational speed based on said calculated phase error, and outputs a position signal representing said calculated estimated phase to said electric power conversion control unit, said feedback operating unit which calculates said estimated rotational speed by amplification of said calculated phase error, calculates said estimated phase by integration of said calculated estimated rotational speed, and capable of changing a gain for said amplification.

* * * * *